United States Patent [19]

Tanaka et al.

[11] Patent Number: 5,390,953
[45] Date of Patent: Feb. 21, 1995

[54] INFLATABLE SEATBELT SYSTEM

[75] Inventors: Yoshihiko Tanaka, Tokyo; Tsuneo Chikaraishi, Hikone, both of Japan

[73] Assignee: Takata Corporation, Tokyo, Japan

[21] Appl. No.: 99,465

[22] Filed: Jul. 30, 1993

[30] Foreign Application Priority Data

Aug. 6, 1992 [JP] Japan .................. 4-210353

[51] Int. Cl.$^6$ ............................................. B60R 21/18
[52] U.S. Cl. ............................ 280/733; 280/801.1
[58] Field of Search ........................ 280/733, 801 R

[56] References Cited

U.S. PATENT DOCUMENTS 3,929,348 12/1975 Lawwill .................. 280/733
3,953,640 4/1976 Takada .................. 280/733

FOREIGN PATENT DOCUMENTS 258239 10/1988 Japan .................. 280/733
1387772 3/1975 United Kingdom .
1416517 12/1975 United Kingdom .

Primary Examiner—Kenneth R. Rice
Attorney, Agent, or Firm—Varndell Legal Group

[57] ABSTRACT

An inflatable seatbelt system having a webbing (11) formed by laying two strap-like webbing base fabrics (11a) and (11b) one on top of the other, which have a predetermined width approximately equal to the width of a typical conventional seatbelt, and sewing the respective side edges of these webbing base fabrics to each other at both lateral ends of the webbing (11). The warp (14) is disposed parallel to the longitudinal direction of the webbing (11), and the weft (15) is disposed perpendicularly to the longitudinal direction of the webbing (11). The warp (14) is formed of threads which do not practically stretch when the webbing (11) inflates. The weft (15) is formed of rubber-like stretchable threads made of an elastic material, e.g., urethane. Accordingly, the webbing (11) inflates to a large extent in the lateral direction, but it does not practically inflate in the longitudinal direction.

12 Claims, 8 Drawing Sheets

INFLATABLE SEATBELT SYSTEM

BACKGROUND OF THE INVENTION

The present invention relates to an inflatable seatbelt system having a webbing at least a part of which is formed in the shape of a bag and which is maintained in a strap-like configuration under normal circumstances but, when an emergency situation occurs, inflates by the action of a gas supplied from a gas generating device.

Hitherto, seatbelt systems have been attached to the seats of many vehicles, for example, automobiles. A typical seatbelt system is arranged to restrain the occupant's body by a webbing upon the occurrence off, an emergency situation, e.g., a collision of the vehicle, thereby protecting the occupant from injury which would otherwise be done to him or her by collision with a part of the vehicle body. In such a seatbelt system, however, the width of the webbing, which constitutes a belt for restraining the occupant's body, is not so large. Therefore, the occupant's body locally receives a relatively heavy load when restrained by the webbing.

Under these circumstances, a variety of inflatable seatbelt systems have been proposed in which the webbing is formed in the shape of a bag, and under normal circumstances, the bag-shaped webbing is maintained in a strap-like configuration so as to function as an ordinary seatbelt, whereas, when an emergency occurs, the bag-shaped webbing is inflated by a gas introduced thereinto from a gas generating device so as to function as an air belt whereby the occupant's body is received by the inflated webbing. For example, see Japanese Patent Application Laid-Open (KOKAI) Nos. 47-26830 and 49-88220. Such an inflatable seatbelt system allows the kinetic energy of the occupant's body to be received by the webbing having a wider area. Thus, the load is dispersed, and hence the occupant's body receives a relatively light load. Accordingly, the occupant is protected even more effectively.

If it is intended to provide a rear seat with an air bag system as is provided for the occupant seated in the front seat, the air bag system must inevitably be provided on the front seat, which lies forwardly of the rear seat. However, if the air bag system is provided on the front seat, it is difficult for the air bag system to protect the rear seat occupant properly and effectively because the position in the longitudinal direction of the front seat depends on the occupant seated therein and the reclining position also differs according to circumstances. Accordingly, the above-described inflatable seatbelt system is particularly effective as a safety device for the rear seat.

Figure 11:
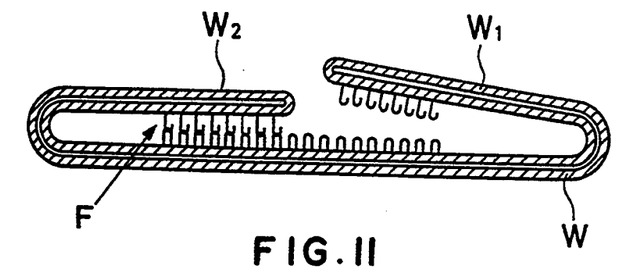
FIG. 11 is a sectional view for explanation of a method of folding a conventional inflatable seatbelt.

Incidentally, various methods have heretofore been employed to maintain the bag-shaped webbing in a strap-like configuration under normal circumstances. For example, a method of maintaining a strap-like configuration is disclosed in the specification and drawings of U.S. Pat. No. 3,865,398. According to this method, both lateral margins $W_1$ and $W_2$ of a webbing W are folded, as shown in FIG. 11, and retained in their folded condition by a fastener or other appropriate engaging device F, thereby maintaining the webbing W in a strap-like configuration having a predetermined width. When the webbing W is to function as an air belt, a gas is supplied into the bag-shaped webbing W to inflate it. When the webbing W is inflated, the engagement made by the engaging device F is canceled by the expansion force. Consequently, the folded portions $W_1$ and $W_2$ are restored to their previous state, thereby allowing the webbing W to inflate to a large extent so as to provide an extremely larger width than the width of the webbing W when maintained in the strap-like configuration.

Figure 12:
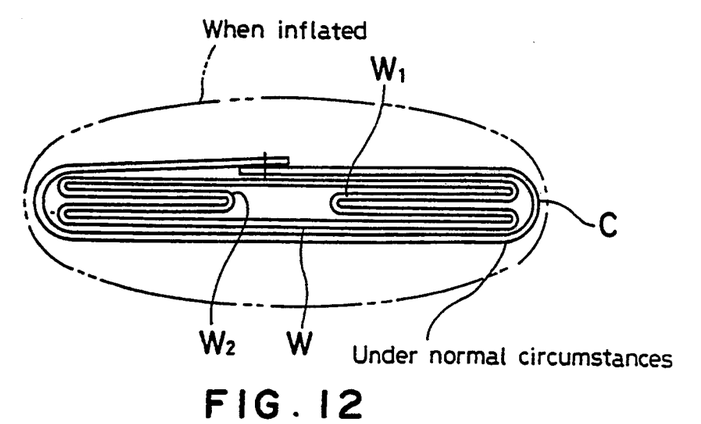
FIG. 12 is a sectional view for explanation of another method of folding a conventional inflatable seatbelt.

As another configuration maintaining method, for example, one such as that shown in FIG. 12 may be conceived. In this method, the bag-shaped webbing W is folded in the shape of a strap having a predetermined width in such a manner that the lateral margins $W_1$ and $W_2$ of the webbing W are reversed inward, and the webbing W is maintained in the strap-like folded condition by using a cover C. When the webbing W is inflated, the sewn part of the cover C is cut off by the expansion force, thereby allowing the webbing W to inflate to a large extent in the same way as the above-described configuration maintaining method.

These conventional configuration maintaining methods for the webbing W suffer, however, from some problems stated below. According to the conventional methods, the webbing W is first formed in a size which is the same as that of the webbing W when inflated, and the webbing W in this condition is folded and thereby maintained in the shape of a strap having a predetermined width so as to function as a seatbelt. Therefore, the webbing W in the folded state is unfavorably thick and bulky. For this reason, when the occupant fastens the seatbelt, the webbing W cannot snugly fit to the occupant's body, making the occupant feel uncomfortable. In addition, the seatbelt cannot smoothly be guided.

Further, since the webbing W is in a folded state, it cannot smoothly be inflated even when the gas is supplied into the bag-shaped webbing W.

In addition, the conventional methods need an operation of folding the webbing W and hence involve a large number of operating steps. Further, when produced, the webbing W needs to be cut into a width which is the same as the width thereof in the inflated condition. Therefore, a large amount of base fabric must be used.

SUMMARY OF THE INVENTION

It is an object of the present invention to provide an inflatable seatbelt system which is designed so that when maintained in a strap-like configuration under normal circumstances, the webbing is not thick nor bulky, and it is possible to eliminate the folding process and to reduce the amount of base fabric used and yet possible to inflate the webbing surely and speedily when an emergency situation occurs.

To attain the above-described object, the present invention provides an inflatable seatbelt system for a vehicle including at least: a device for generating a gas when deceleration acting on the vehicle upon the occurrence of an emergency situation, for example, a collision of the vehicle, exceeds first set deceleration; a webbing having a portion brought into contact with the occupant's body, at least a part of the contact portion being formed as a bag-shaped portion, the webbing being arranged such that when no gas is generated from the gas generating device, the webbing is maintained in the shape of a strap having a predetermined width, whereas, when a gas is generated from the gas generating device, the bag-shaped portion is inflated by the gas; a retractor operating such that when the deceleration on the vehicle is not higher than second set deceleration, which is lower than the first set deceleration, the retractor allows the webbing to be freely wound up and unwound, whereas, when the deceleration on the vehicle exceeds the second set deceleration, the retractor prevents unwinding of the webbing; a tongue connected to the webbing; and a buckle device with which the tongue is disengageably engaged. At least the bag-shaped portion of the webbing is formed of a webbing base fabric made out of a woven fabric. The warp of the webbing base fabric is disposed in the longitudinal direction of the seatbelt, whereas the weft is disposed in the lateral direction of the seatbelt. The warp has such load-elongation characteristics that the bag-shaped portion can function as a seatbelt for restraining the occupant's body even when tension is applied thereto by expansion force generated when the bag-shaped portion is inflated by the gas from the gas generating device upon the occurrence of an emergency situation. The weft is formed so as to be stretchable by a predetermined amount when tension is applied thereto by expansion force generated when the bag-shaped portion is inflated.

The webbing base fabric may be formed by hollow weave.

The webbing base fabric may be formed by joining together the respective side edges of two webbing base fabrics set to have a predetermined width required under normal circumstances.

The weft may be formed of threads made of a material having a relatively low modulus off, elasticity and stretchable in a rubber-like manner.

The weft may be formed by coiling a second thread, made of a material having a high modulus of elasticity and high strength and set to a length which is the same as a predetermined width of the bag-shaped portion after the inflation, around a first thread made of a material having a relatively high modulus of elasticity and set to a length which is the same as a predetermined width of the bag-shaped portion under normal circumstances, e.g., polyester.

The weft may be formed of a mixture of a thread made of a material having a relatively low modulus of elasticity and stretchable in a rubber-like manner and a thread made of a material having a relatively high modulus of elasticity and relatively low strength.

A tube which is inflatable by the gas may be inserted into the bag-shaped portion formed of the webbing base fabric.

The tube may be formed of either urethane rubber or silicone rubber.

The arrangement may also be such that the tongue is connected to the bag-shaped portion of the webbing, and the tongue is formed with a gas flow hole, and that the buckle device is provided with the gas generating device and formed with a gas flow hole communicated with the gas generating device so that when the tongue is engaged with the buckle device, the gas flow hole formed in the tongue and the gas flow hole formed in the buckle device form a gas flow passage for introducing the gas generated by the gas generating device into the bag-shaped portion of the webbing.

In the inflatable seatbelt system according to the present invention, arranged as described above, if the deceleration acting on the vehicle is higher than the second set deceleration and not higher than the first set deceleration, the gas generating device is not activated. At this time, the webbing is maintained in the shape of a strap having a predetermined width, and the warp does not practically stretch by virtue of its load-elongation characteristics. Therefore, the webbing surely restrains the occupant's body. Accordingly, the inflatable seatbelt system functions as a seatbelt similar to the conventional seatbelt.

If the deceleration on the vehicle exceeds the first set deceleration, the gas generating device is activated to generate a gas. Consequently, the bag-shaped portion of the webbing is inflated by the gas. In this case, the inflation of the bag-shaped portion is realized by the stretching of the weft caused by the expansion force generated when the bag-shaped portion of the webbing is inflated by the gas. Since the occupant's body is surely and effectively supported by the inflated bag-shaped portion of the webbing, the kinetic energy of the occupant's body is received with a relatively wide area. As a result, the load is dispersed, and the occupant is reliably protected from a heavy impact load. That is, the inflatable sea,belt system functions as an air belt. Moreover, since the Warp does not practically stretch at this time, the inflatable seatbelt system also functions as a seatbelt.

Further, since the weft of the webbing base fabric stretches when the webbing is inflated by the gas from the gas generating device, the width of the webbing base fabric need not be set equal to a relatively large width of the webbing after the inflation but may be set to be the same as a predetermined width of the seatbelt under normal circumstances. Accordingly, it becomes unnecessary to fold the webbing, and the thickness of the seatbelt under normal circumstances can be made extremely small. Thus, the seatbelt can be unwound and rewound even more smoothly. In addition, since it is possible to minimize the belt take-up capacity of the seatbelt retractors, the retractors can be formed in even more compact structures.

Further, since the seatbelt need not be folded, there is no need for a seatbelt folding operation, which requires a great deal of time and labor, during the assembly of the seatbelt. Accordingly, it is possible to reduce the number of operating steps required for the production of the seatbelt and to assemble the seatbelt extremely easily.

In addition, since the two webbing base fabrics, which constitute the seatbelt, can be set equal to the width of the ordinary seatbelt, the amount of base fabric used can be reduced by a large margin in comparison to the conventional inflatable seatbelt.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIGS. 3(a) and 3(b) are views showing a shoulder belt employed in the embodiment, in which

FIGS. 4(a), 4(b) and 4(c) are views showing a webbing in the embodiment, in which

FIGS. 5(a) through 5(f) are view showing a buckle device employed in the embodiment, in which

FIGS. 6(a), 6(b) and 6(c) are views for explanation of a method of attaching the tongue to the webbing in the embodiment, in which

FIGS. 7(a) and 7(b) are views showing a belt cap employed in the embodiment, in which

FIGS. 8(a) and 8(b) are views showing another embodiment of the present invention, in which

DESCRIPTION OF THE PREFERRED EMBODIMENTS

Figure 1:
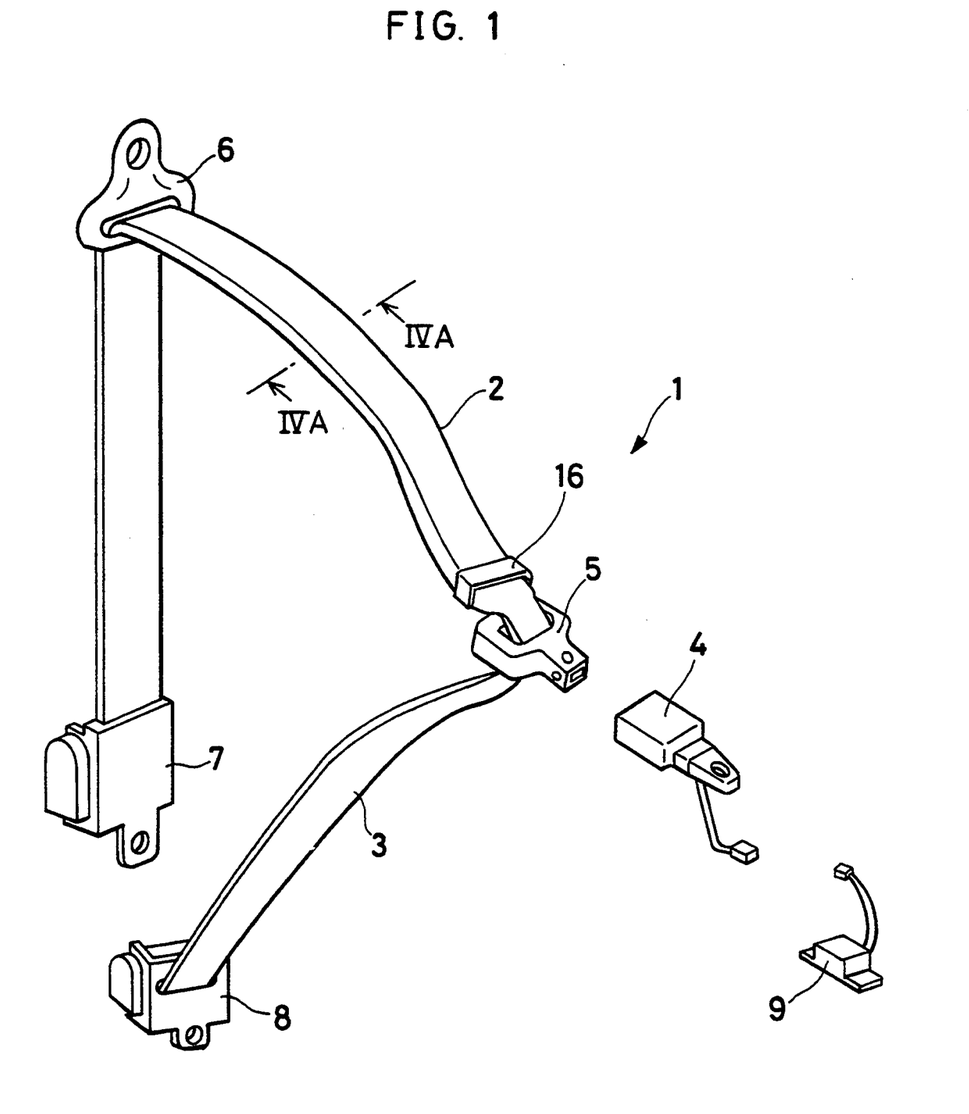
FIG. 1 schematically shows the whole arrangement of one embodiment of the inflatable seatbelt system according to the present invention.

As shown in FIG. 1, the inflatable seatbelt system 1 in this embodiment has a shoulder belt 2 disposed to extend obliquely downward from one side to the other of the occupant's body (from the right-hand side to the left-hand side in the illustrated example), a lap belt 3 disposed to extend from one side to the other of the occupant's body (from the right-hand side to the left-hand side in the illustrated example), a buckle device 4 disposed, for example, on the floor of a vehicle body, a tongue 5 inserted into the buckle device 4 so as to be engaged therewith when the occupant fastens the seatbelt, a pillar anchor 6 disposed on a center pillar or other vehicle body member to serve as an intermediate guide for guiding the shoulder belt 2, a retractor 7 with a clamp for winding up the shoulder belt 2, a retractor 8 for winding up the lap belt 3, and a deceleration sensor 9 accommodated in the buckle device 4 for sensing extremely high deceleration as acts upon the occurrence of a collision of the vehicle or other similar accident.

Figure 2:
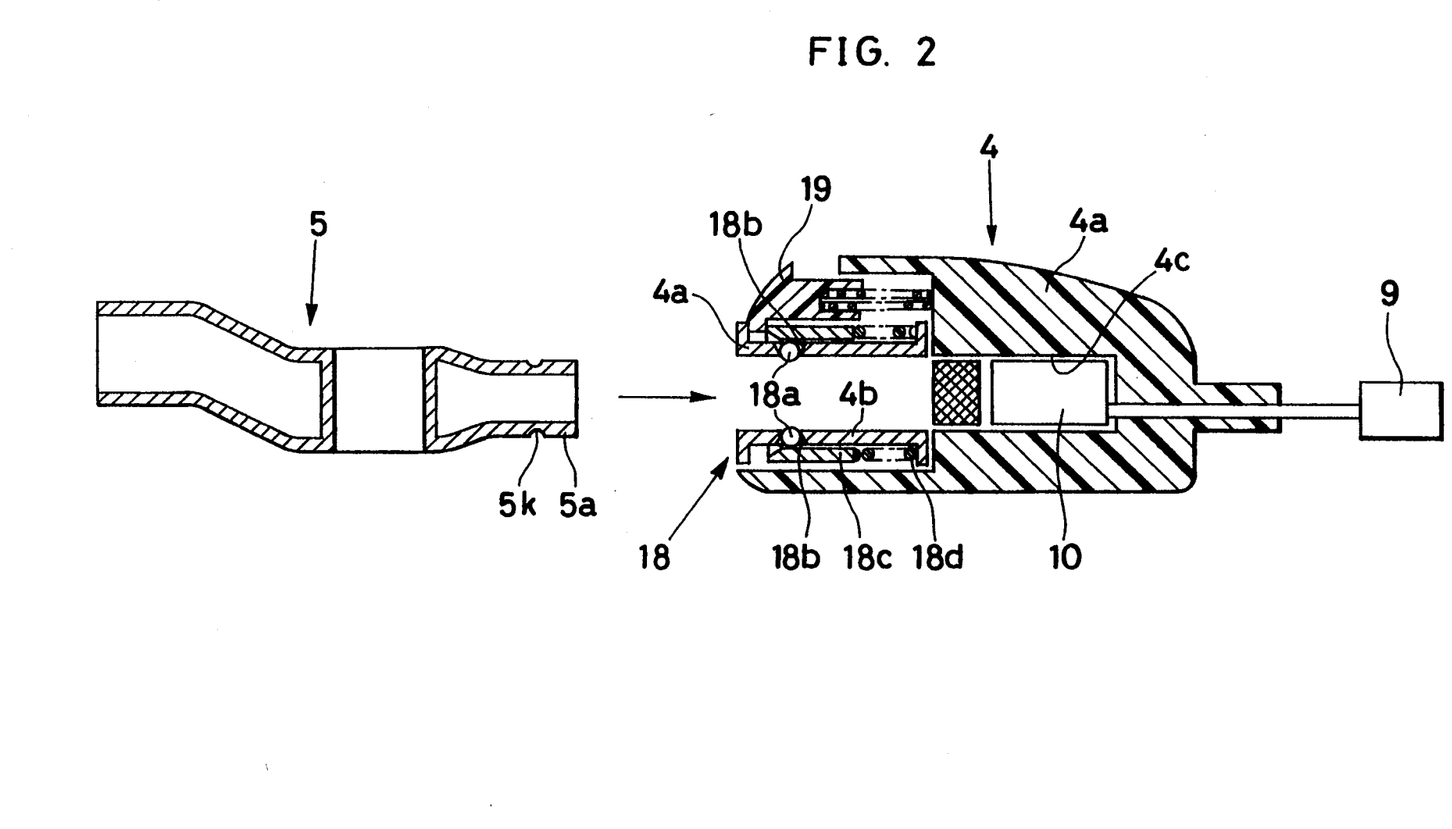
FIG. 2 is a sectional view schematically showing one example of the structure for engagement between a tongue and a buckle device, which are employed in the embodiment.

As shown in FIG. 2, the buckle device 4 has a body 4a, an insertion hole 4b provided in the body 4a for insertion of the tongue 5, and an accommodating hole 4c formed in the body 4a contiguously with the insertion hole 4b. The accommodating hole 4c accommodates a gas generator (G.G.) 10 as a gas generating device in the present invention, which is connected to the deceleration sensor 9. The gas generator 10 is activated to generate a high-pressure gas in response to a high-deceleration detecting signal from the deceleration sensor 9.

An engaging device 18 is provided in the insertion hole 4b. The engaging device 18 is arranged such that when the tongue 5 is inserted into the insertion hole 4b, the engaging device 18 engages with the tongue 5. The engaging device 18 has ball-shaped engagement members 18a, and frusto-conical guide holes 18b formed in the body 4a such that the small-diameter side of each guide hole 18b opens to the insertion hole 4b so as to guide the associated engagement member 18a between two positions, that is, an engaging position where the engagement member 18a projects into the insertion hole 4b, and a non-engaging position where the engagement member 18a withdraws from the insertion hole 4b. The engaging device 18 further has a square cylinder-shaped lock member 18c for locking the engagement members 18a in the engaging position, and a spring 18d for biasing the lock member 18c in the direction for locking the engagement members 18a.

The buckle device 4 is further provided with a release button 19 for moving the lock member 18c in the direction for unlocking the engagement members 18a against the biasing force of the spring 18d. On the other hand, an insertion portion 5a of the tongue 5 is formed with engagement grooves 5k which are engaged with the engagement members 18a when in the engaging position.

When the tongue 5 is to be engaged with the buckle device 4 to fasten the seatbelt, the release button 19 is first moved rightwardly as viewed in FIG. 2 to move the lock member 18c to the unlock position where the engagement members 18a are movable to the respective non-engaging positions. In this state, the insertion portion 5a of the tongue 5 is inserted into the insertion hole 4b, and the engagement members 18a are fitted into the respective engagement grooves 5k.

When the release button 19 is released after the engagement members 18a have been fitted into the engagement grooves 5k, the release button 19 and the lock member 18c return to their previous positions shown in the figure. In the illustrated position, the lock member 18c locks the engagement members 18a in the state of being fitted in the engagement grooves 5k. Thus, the tongue 5 is locked to the buckle device 4. It should be noted that the structure of the tongue 5 will be detailed later.

Figure 3A:
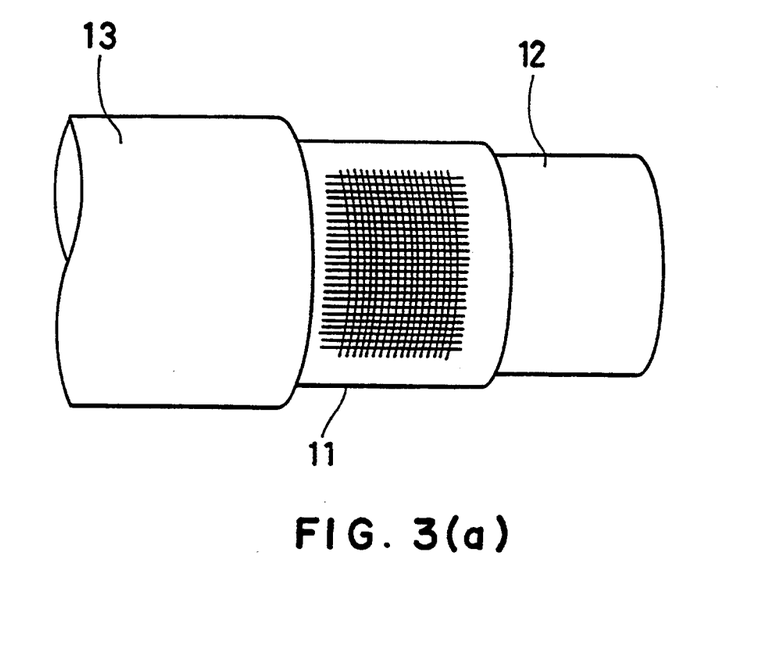
FIG. 3(a) is a perspective view showing constituent elements of the shoulder belt in a staggered manner.
Figure 3B:
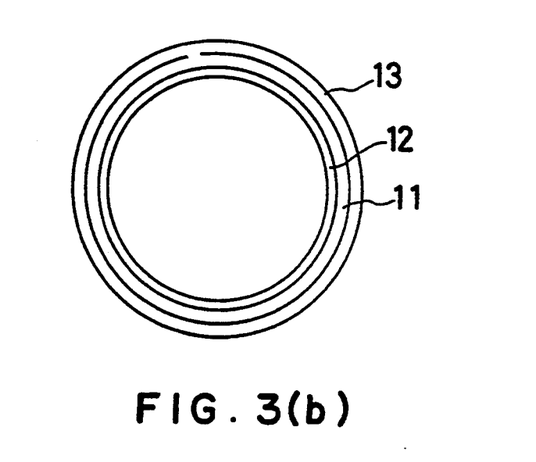
FIG. 3(b) is a cross-sectional view of the shoulder belt.

The shoulder belt 2 and the lap belt 3 are formed as one unit. As shown in FIGS. 3(a) and 3(b), these belts are formed from a tubular webbing 11, a tube 12 inserted in the webbing 11, and a cover 13 covering the webbing 11. The tube 12 is made of an elastic material which can be formed relatively thin and which has heat resistance and relatively high strength, e.g., urethane, silicone, etc. The cover 13 is made of a resin material, e.g., polyester.

Figure 4A:
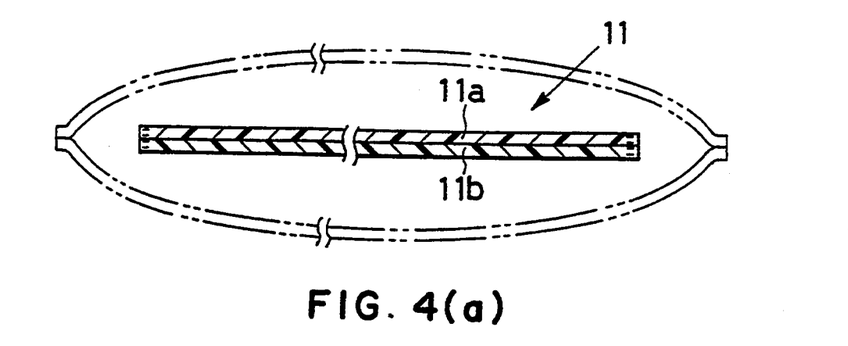
FIG. 4(a) is a sectional view taken along the line IVA—IVA in FIG. 1.
Figure 4B:
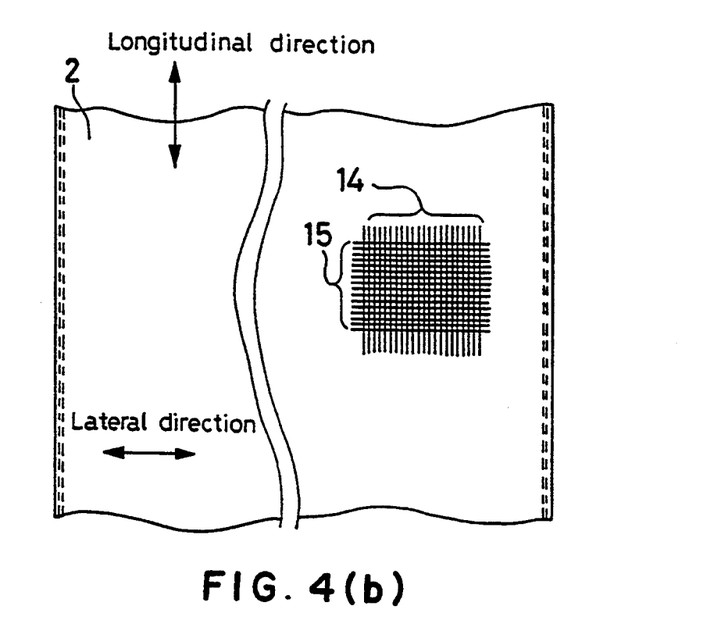
FIG. 4(b) shows the positional relationship between the warp and the weft.

As shown in FIGS. 4(a) and 4(b), the webbing 11 is formed in a tubular configuration by laying two strap-like webbing base fabrics 11a and 11b one on top of the other, which are woven fabrics each cut into a predetermined width (e.g., 50 mm), which is approximately equal to the width of a typical conventional seatbelt, and then sewing the respective side edges of the base fabrics 11a and 11b to each other at both lateral ends of the webbing 11. In this case, the warp 14 is disposed parallel to the longitudinal direction of the webbing 11, and the weft 15 is disposed in the lateral direction of the webbing 11, as shown in FIG. 4(b).

The warp 14 is formed of threads which are not practically stretchable and have high strength, made of the same material as that of the webbing of the conventional seatbelt. In other words, the warp 14 is formed by using threads having such load-elongation characteristics that the warp 14 will not practically stretch even if tension is applied thereto when the webbing 11 is inflated by the action of the gas generator 10, as described later.

Figure 4C:
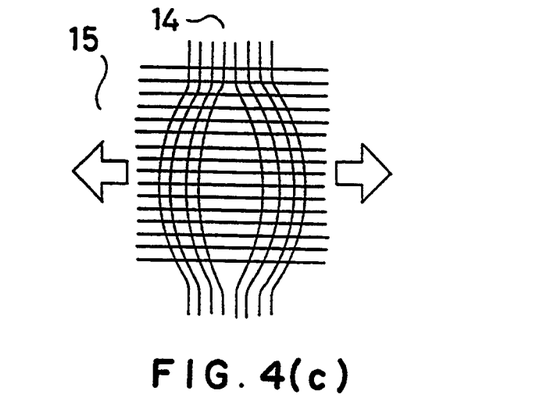
FIG. 4(c) is a view for explanation of the features of the webbing.

On the other hand, the weft 15 is formed of rubber-like stretchable threads made of an elastic material, e.g., urethane. Accordingly, when a predetermined level of tension is laterally applied to the webbing 11, the webbing base fabrics 11a and 11b stretch laterally to a relatively large extent, as shown in FIG. 4(c), whereas, when tension is longitudinally applied thereto, the webbing base fabrics 11a and 11b do not practically stretch longitudinally. It should be noted that in FIG. 4(c), the weft 15 is shown to be stretching by the illustration of the enlarged gap between the warp threads 14. It should also be noted that in FIG. 4(c) the warp 14 looks as if it were curvedly stretching because of the exaggerated illustration, but actually, the warp 14 does not practically stretch.

In the webbing 11 formed as described above, the weft 15 is normally in the most contracted state, as shown by the solid line in FIGS. 4(a) and 4(b). In this normal condition, the width of the webbing 11 is approximately the same as that of the webbing of the conventional seatbelt. In the normal condition, the webbing 11 is in the flattest state and hence the thickness thereof is the smallest.

In actual use, at least a part of the tubular webbing 11 is formed in the shape of a bag. When a gas is supplied into the bag-shaped portion of the webbing 11, the bag-shaped portion is caused to inflate by the gas pressure. At this time, tension is applied to both the warp 14 and the weft 15 by the expansion force of the bag-shaped portion of the webbing 11. As has been described above, the warp 14 does not practically stretch even if such tension is applied thereto, but the weft 15 is stretched by the tension. Consequently, the webbing 11 inflates to a large extent in the lateral direction but does not practically expand longitudinally, as shown by the two-dot chain line in FIG. 4(a).

As shown in FIGS. 5(a) through 5(f), the tongue 5 includes an insertion portion 5a, which has a gas inlet port $5a_1$ and is inserted into and engaged with the buckle device 4, and an operating portion 5c that guides the lap belt 3 by a guide hole 5b wherein the lap belt 3 passes and that is used to engage and disengage the tongue 5 in relation to the buckle device 4. The tongue 5 further includes a connecting portion 5d to which the shoulder belt 2 is connected, and an engagement portion (not shown) which is engaged with the engaging device of the buckle device 4 when the buckle 5 is inserted into the buckle device 4. The connecting portion 5d includes a gas outlet portion 5e formed with a gas outlet port $5e_1$, and a neck portion 5f that connects the gas outlet portion 5e to the operating portion 5c.

The insertion portion 5a, the operating portion 5c, the neck portion 5f and the gas outlet portion 5e are formed with a continuous gas flow hole 5g extending through these portions to provide communication between the gas inlet port $5a_1$ and the gas outlet port $5e_1$. In this case, the gas flow hole 5g is formed to bypass the guide hole 5b of the operating portion 5c so as not to interfere with it.

Figure 5A:
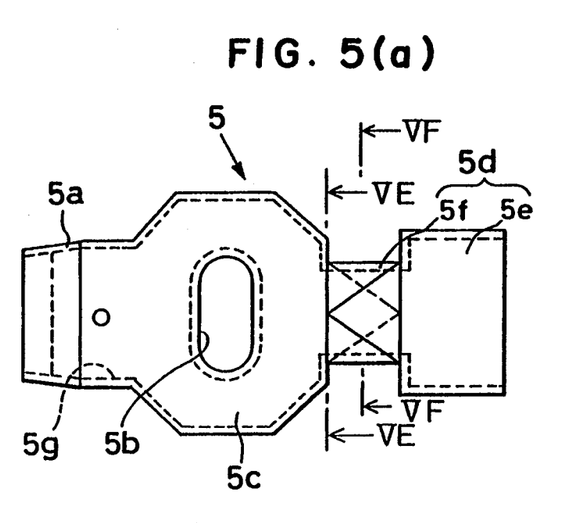
FIG. 5(a) is a plan view of the buckle device.
Figure 5B:
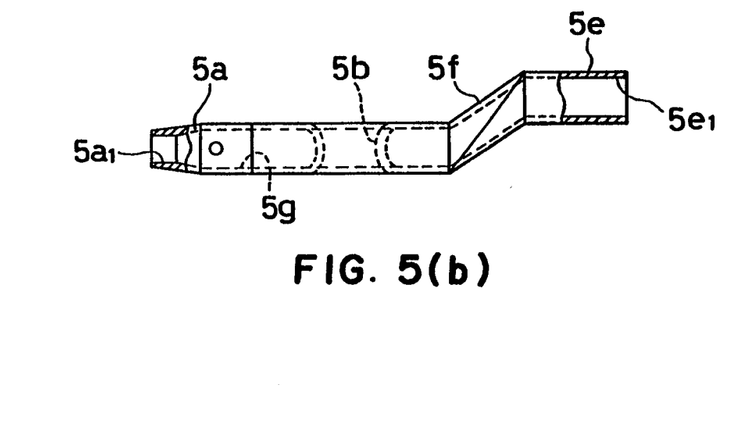
FIG. 5(b) is a front view of the buckle device.
Figure 5C:
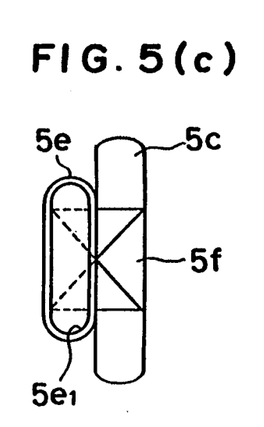
FIG. 5(c) is a side view of the buckle device as seen from the right-hand side thereof.
Figure 5D:
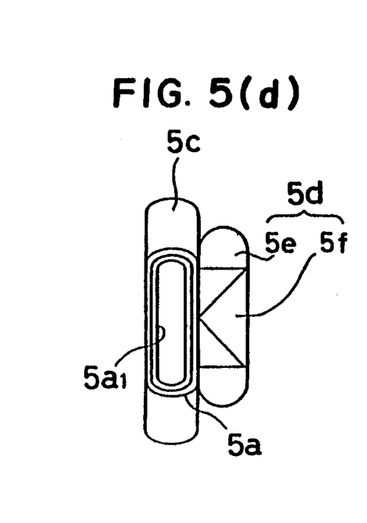
FIG. 5(d) is a side view of the buckle device as seen from the left-hand side thereof.
Figure 5E:
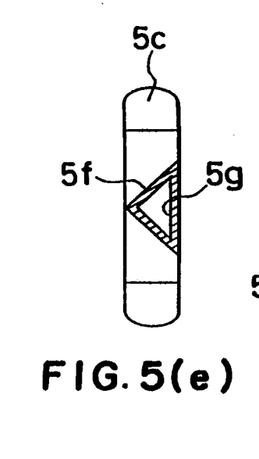
FIG. 5(e) is a sectional view taken along the line VE—VE in FIG. 5(a)
Figure 5F:
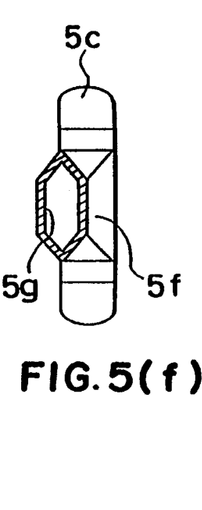
FIG. 5(f) is a sectional view taken along the line VF—VF in FIG. 5(a).

In addition, the insertion portion 5a, the operating portion 5c and the gas outlet portion 5e are each formed to have a rectangular or elliptical cross-sectional configuration. Further, the end of the neck portion 5f which is connected to the operating portion 5c is formed to have a triangular cross-sectional configuration, as shown in FIG. 5(e), and the axially central portion of the neck portion 5f has a hexagonal cross-sectional configuration. That is, the neck portion 5f is formed in such a configuration that the two axial ends thereof have triangular cross-sectional configurations which are inverse to each other, and the intermediate portion of the neck portion 5f has a hexagonal cross-sectional configuration. Further, the insertion portion 5a and the operating portion 5c are disposed on a plane different from the plane where the gas outlet portion 5e is disposed.

Figure 6A:
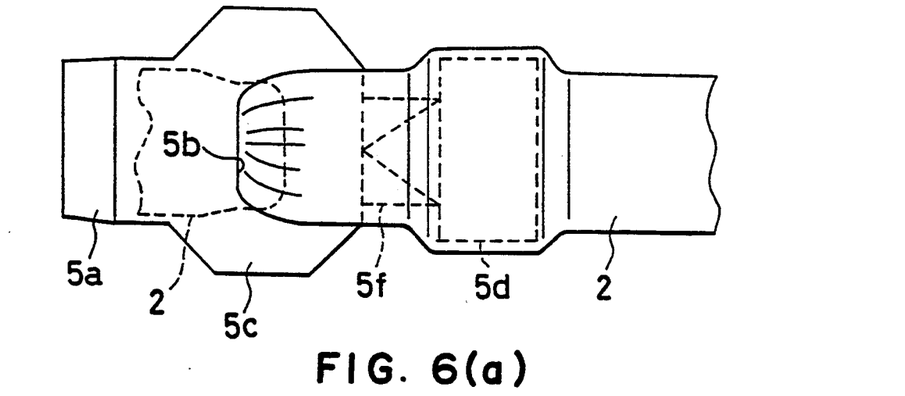
FIG. 6(a) is a plan view of the joint of the tongue and the webbing.
Figure 6B:
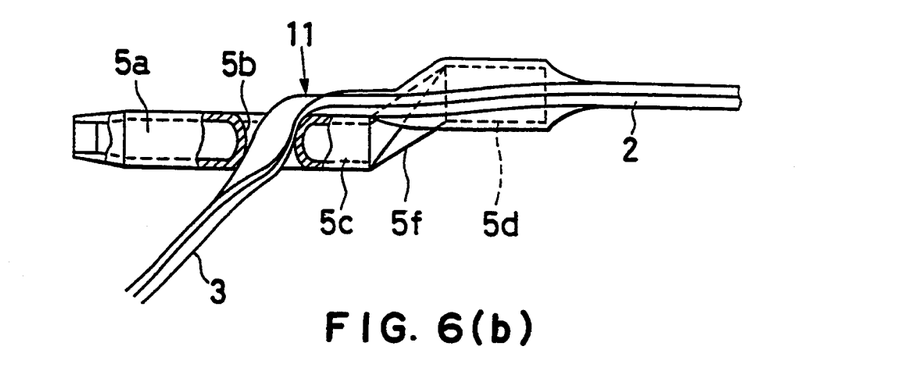
FIG. 6(b) is a partially-cutaway front view of the joint.
Figure 6C:
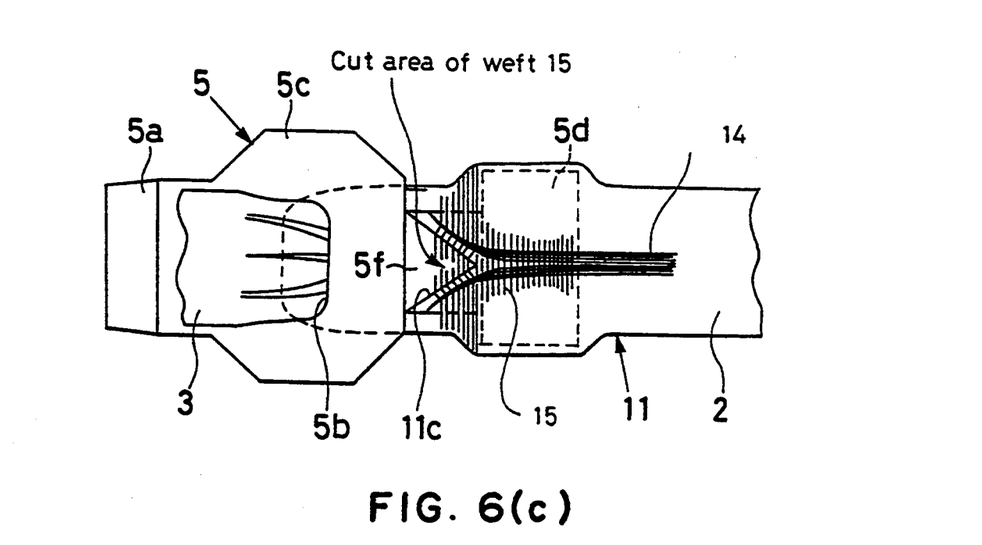
FIG. 6(c) is a bottom plan view thereof.
Figures 7A, 7B:
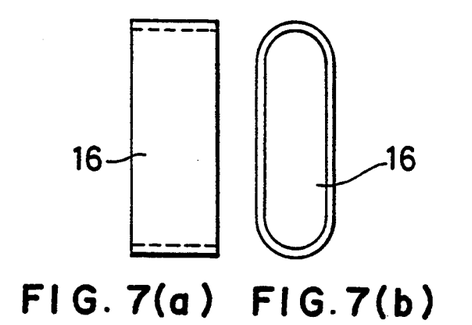
FIG. 7(a) is a front view of the belt cap.
FIG. 7(b) is a side view of the belt cap.

The following is a description of a method of attaching the tongue 5, arranged as described above, to the webbing 11 constituting the shoulder belt 2 and the lap belt 3. As shown in FIG. 6(c), the weft 15 on the reverse side of the portion of the webbing 11 which corresponds to the boundary between the shoulder belt 2 and the lap belt 3 is cut over a predetermined area at the center in the direction of the width of the webbing 11. Next, the weft cut area of the webbing 11 is widened in the lateral direction to form an opening 11c having a predetermined width. The connecting portion 5d of the tongue 5 is inserted into the webbing 11 toward the shoulder belt portion thereof from the opening 11c. Then, as clearly shown in FIG. 6(b), the lap belt portion of the webbing 11 is passed through the hole 5b provided in the operating portion 5c by slightly contracting the webbing 11 in the lateral direction. Finally, as shown in FIGS. 7(a) and 7(b), an annular belt cap 16 made of an elastic metal material is fitted onto the gas outlet portion 5e of the tongue 5 with the webbing 11 interposed therebetween, thereby securing the tongue 5 to the webbing 11.

The tongue 5 attached to the webbing 11 in this way is surely secured to the webbing 11 without the likelihood of slipping out of from the webbing 11 because the connecting portion 5d is firmly clamped not only by the elastic force of the weft 15 of the webbing 11 but also by the elastic force of the belt cap 16 and because the width of the neck portion 5f of the connecting portion 5d is smaller than the width of the gas outlet portion 5e.

Further, in the state where the tongue 5 is connected to the webbing 11, the neck portion 5f of the tongue 5 lies in the weft cut area of the webbing 11. Since the neck portion 5f has a cross-section varying from a triangular configuration to a hexagonal configuration, it is possible to minimize the number of weft threads 15 to be cut to form the opening 11c in the webbing 11.

In the inflatable seatbelt system 1 of this embodiment, arranged as described above, the shoulder belt 2 of the bag-shaped webbing 11 is uninflated and maintained in a thin strap-like configuration under normal circumstances, as shown by the solid line in FIG. 4(a). When the seatbelt is not fastened to the occupant's body, the buckle device 4 and the tongue 5 are not in engagement with each other, and the shoulder belt 2 has been wound up by the retractor 7 having a clamp, while the lap belt 3 has been wound up by the retractor 8.

The occupant seated in the seat unwinds the shoulder and lap belts 2 and 3 from the respective retractors 7 and 8 and inserts the tongue 5 into the buckle device 4, thereby fastening the seatbelt. In this seatbelt set condition, the tongue 5 is locked to the buckle device 4 by the lock device, and hence the tongue 5 and the buckle device 4 are maintained in the connected condition without likelihood of the tongue 5 undesirably disengaging from the buckle device 4. Further, when the tongue 5 and the buckle device 4 are in the connected state, the gas flow hole 4b in the buckle device 4 and the gas flow hole 5g in the tongue 5 align with each other to form a single gas flow passage.

Further, in the seatbelt set condition, the shoulder and lap belts 2 and 3 are fitted to the occupant's body by being biased with relatively weak force in the winding-up direction by the respective retractors 7 and 8. This biasing force has previously been set to such a level that the seatbelt will not give a sensation of pressure to the occupant. In addition, under normal circumstances, the take-up reels of the seatbelt retractors 7 and 8 are not locked. Therefore, the two belts 2 and 3 can be unwound freely. Thus, the shoulder belt 2 and the lap belt 3 are smoothly unwound and rewound in response to the normal movement of the occupant's body, thereby allowing an improvement in the comfortability of the seatbelt.

If the deceleration acting on the vehicle exceeds second set deceleration during the running of the vehicle, the occupant's body is urged to move forwardly by inertia force, pressing both the belts 2 and 3 to be unwound from the respective seatbelt retractors 7 and 8. However, at this time, the deceleration sensors associated with the retractors 7 and 8 operate to lock the take-up reels, thereby preventing the belts 2 and 3 from being unwound. Particularly, in the seatbelt retractor 7, the shoulder belt 2 is clamped by the clamp. Therefore, the shoulder belt 2 is even more surely prevented from being unwound. Moreover, even if tension is applied to the two belts 2 and 3 in the longitudinal direction of the seatbelt by the inertial movement of the occupant's body, the belts 2 and 3 will not practically stretch because the warp 14, disposed longitudinally, will not practically stretch.

Accordingly, the occupant's body is effectively and reliably restrained by the shoulder and lap belts 2 and 3, thereby being prevented from moving forwardly. At this time, the shoulder belt 2 is guided by the intermediate guide 6 so as to come in contact with the correct position on the occupant's body. Thus, the inflatable seatbelt system 1 of this embodiment functions as a seatbelt for restraining the occupant's body in a similar manner to the conventional seatbelt system. It should be noted that although the weft 15 in a predetermined region is cut when the tongue 5 is to be attached to the webbing 11, the warp 14 is not cut at all. Therefore, sufficiently high strength is ensured for the two belts 2 and 3 to endure tension in the longitudinal direction.

If extremely high deceleration acting on the vehicle upon the occurrence of an emergency, e.g., a collision of the vehicle, exceeds first set deceleration, not only both the belts 2 and 3 are prevented from being unwound by the seatbelt retractors 7 and 8, but also the deceleration sensor 9 provided on the vehicle detects the extremely high deceleration and activates the gas generator 10. Consequently, the gas generator 10 generates a high-pressure gas, and the gas thus generated instantaneously enters the bag-shaped shoulder belt 2 through the gas flow holes 4b and 5g, which are respectively provided in the buckle device 4 and the tongue 5.

As a result, the weft 15 is stretched by the pressure of the gas entering the shoulder belt 2. Therefore, the shoulder belt 2 surely and almost instantaneously inflates into a configuration such as that shown by the two-dot chain line in FIG. 4(a).

Accordingly, the upper half of the occupant's body, i.e., the shoulder, the chest, etc., is surely and effectively supported by the inflated shoulder belt 2. Since the kinetic energy of the occupant's body is received with a relatively wide area by virtue of the inflation of the shoulder belt 2, the load is dispersed, and the occupant is reliably protected from a heavy impact load. That is, the inflatable seatbelt system 1 functions as an air belt.

When the shoulder belt 2 inflates, the weft 15 stretches, but the warp 14 slightly contracts. Therefore, the shoulder belt 2 slightly contracts in the longitudinal direction. As a result, the inflatable seatbelt system 1 can function as a pretensioner by virtue of the inflation of the shoulder belt 2, thereby enabling the slack in the seat belt to be taken up. Thus, the inflatable seatbelt system 1 surely and effectively exhibits the seatbelt function, resulting in an improvement in the occupant restraining performance of the seatbelt.

To release the tongue 5 from the buckle device 4, the lock made by the engaging device 18 is canceled by actuating the release button 19. Consequently, the tongue 5 disengages from the buckle device 4. In addition, the shoulder and lap belts 2 and 3 are wound up by the respective seatbelt retractors 7 and 8.

With the inflatable seatbelt system 1 of this embodiment, arranged as described above, the webbing 11 is formed simply by laying two webbing base fabrics 11a and 11b one on top of the other, which are set to have a width equal to that of the ordinary seatbelt. Accordingly, the thickness of the seatbelt under normal circumstances can be made extremely small in comparison to the folded seatbelt in the conventional inflatable seatbelt system. Thus, the seatbelt can be unwound and rewound even more smoothly. In addition, since it is possible to minimize the belt take-up capacity of the seatbelt retractors 7 and 8, these retractors 7 and 8 can be formed in even more compact structures.

Further, since the seatbelt need not be folded, it is unnecessary to conduct a seatbelt folding operation, which requires a great deal of time and labor, during the assembly of the seatbelt. Accordingly, it is possible to reduce the number of operating steps needed for the production of the seatbelt and to assemble the seatbelt extremely easily.

In addition, since the two webbing base fabrics 11a and 11b, which constitute the seatbelt, are cut into a width equal to that of the ordinary seatbelt, the amount of base fabric used can be reduced by a large margin in comparison to the conventional inflatable seatbelt.

Figures 8A, 8B:
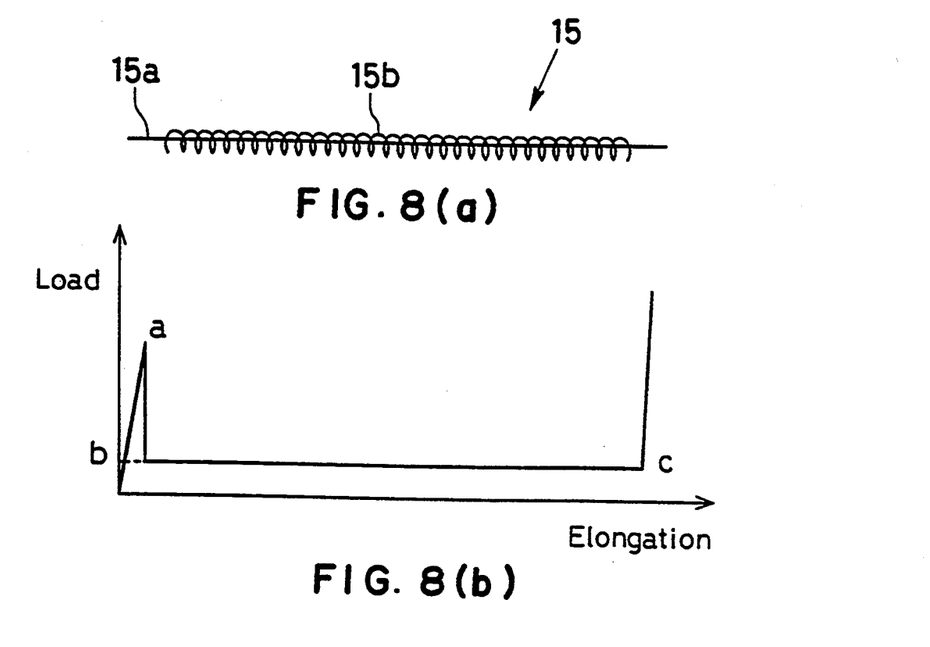
FIG. 8(a) shows weft employed in the second embodiment.
FIG. 8(b) is a graph showing load-elongation characteristics of the weft.

FIGS. 8(a) and 8(b) show another embodiment of the present invention. It should be noted that in this embodiment the same constituent elements as those in the above-described embodiment are denoted by the same reference numerals and detailed description thereof is omitted.

In the first embodiment the weft 15 of the webbing 11 is comprised of rubber-like stretchable threads made of an elastic material, e.g., urethane, whereas in the second embodiment the weft 15 comprises threads each formed by coiling a second thread 15b made of high-modulus, high-tenacity fibers, e.g., Kevlar (trade name, Du Pont), around a first thread 15a having a relatively high modulus of elasticity, made of a resin material, e.g., polyester, as shown in FIG. 8(a).

The weft 15, arranged as described above, has load-elongation characteristics as shown in FIG. 8(b). Referring to FIG. 8(b), when tension is applied to the weft 15, the tension is first received by the first thread 15a. Since the first thread 15a has a relatively high modulus of elasticity, it does not practically stretch as the tension increases. Accordingly, even if tension is applied thereto, the weft 15 does not stretch at the beginning. When the tension increases to the breaking load a of the first thread 15a, the thread 15a breaks. As a result, the applied tension is now received by the second thread 15b. Since the second thread 15b is in the coiled state at the time when the first thread 15a breaks, it stretches to a substantial extent as far as a point c where it becomes straight in response to relatively small tension b. That is, after the breaking load a of the first thread 15a has been exceeded, the weft 15 stretches with ease and by a large margin until the elongation reaches the point c in response to relatively small tension b.

When the elongation of the first thread 15a reaches the point c, the second thread 15b becomes completely straight. However, since the second thread 15b has a high modulus of elasticity, it does not practically stretch even if the tension applied to the second thread 15b increases. Accordingly, the weft 15 does not practically stretch.

In this embodiment, webbing base fabrics 11a and 11b are woven by using the weft 15 having the above-described load-elongation characteristics and the same warp 14 as that employed in the first embodiment, and a webbing 11 is produced by using these webbing base fabrics 11a and 11b in the same way as in the first embodiment. Consequently, the webbing 11 does not practically stretch until the tension applied thereto reaches a certain set load. When the tension exceeds the set load, the webbing 11 laterally stretches with ease in response to the application of relatively small load. When the lateral stretching reaches a certain set value, the webbing 11 does not practically stretch any more. Thus, the webbing 11 has ideal load-elongation characteristics for an inflatable seatbelt. The other advantageous effects of this embodiment are substantially the same as those of the first embodiment.

Figure 9:
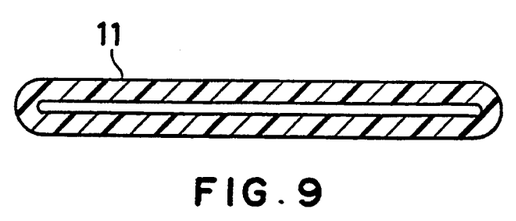
FIG. 9 shows still another embodiment of the present invention.

FIG. 9 shows still another embodiment of the present invention.

In the foregoing embodiments, the tubular webbing 11 is formed by laying two webbing base fabrics 11a and 11b one on top of the other and then sewing the respective side edges of these base fabrics 11a and 11b to each other. In this embodiment, however, the webbing 11 is formed in a tubular configuration by hollow weave, as shown in FIG. 9. The use of the base fabric produced by hollow weave makes it possible to eliminate the need for a sewing operation and hence possible to reduce the number of manufacturing steps. The other advantageous effects of this embodiment are substantially the same as those of the foregoing embodiments.

Figure 10:
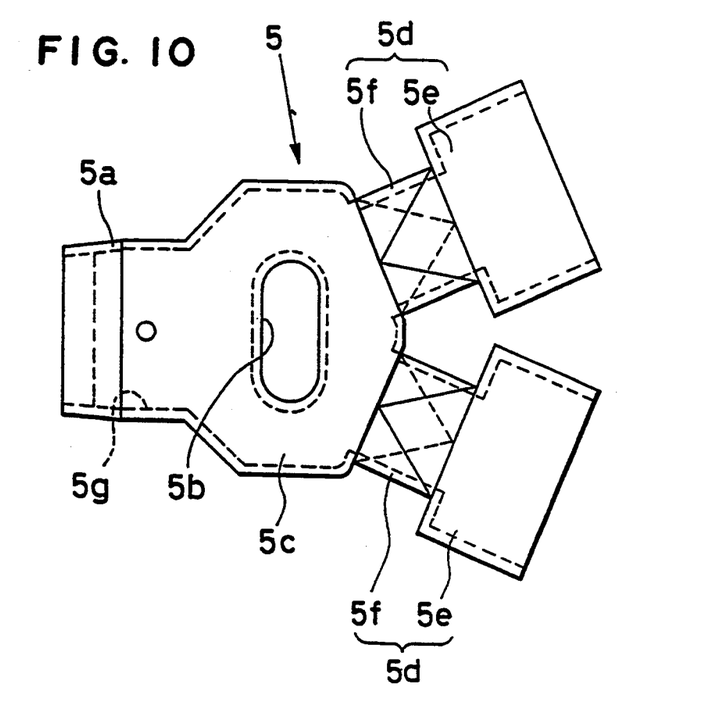
FIG. 10 is a plan view showing a modification of the tongue employed in the inflatable seatbelt system of the present invention.

It should be noted that the present invention is not necessarily limited to the foregoing embodiments and that various changes and modifications in design may be imparted thereto. For example, although in the above-described embodiments the tongue 5 is provided with only the gas flow hole 5a communicated with the bag-shaped belt 2b of the shoulder belt 2, the arrangement may be such that, as shown in FIG. 10, the gas flow hole 5a provided in the tongue 5 is bifurcated, and the lap belt 3 is formed as a bag-shaped belt, thereby enabling the gas flow hole 5a to communicate with not only the bag-shaped belt 2b of the shoulder belt 2 but also with the bag-shaped belt of the lap belt 3. With this arrangement, the effectiveness of the air belt can be further enhanced, and the occupant can be protected even more effectively.

It is also possible to form the weft 15 by using a mixture of threads made of a material having a relatively low modulus of elasticity and stretchable in a rubber-like manner and threads made of a material having a relatively high modulus of elasticity and relatively low strength.

Further, although in the foregoing embodiments the shoulder belt 2 and the lap belt 3 are formed as one unit, these belts 2 and 3 may be formed as discrete members. In such a case, a conventional seatbelt maybe employed as the lap belt 3.

As will be clear from the foregoing description, the inflatable seatbelt system of the present invention can function not only as a seatbelt for restraining the occupant's body in a similar manner to the conventional seatbelt system but also as an air belt for surely protecting the occupant from a heavy impact load by receiving the kinetic energy of the occupant's body with a relatively wide area. Since the webbing of the inflatable seatbelt system is not folded, it can be inflated speedily and smoothly.

Further, according to the present invention, the thickness of the seatbelt under normal circumstances can be reduced to an extremely small value because the webbing need not be folded. Accordingly, the seatbelt can be unwound and rewound even more smoothly. In addition, since it is possible to minimize the belt take,up capacity of the seatbelt retractors, these retractors can be formed in even more compact structures.

Further, since the seatbelt need not be folded, it is unnecessary to conduct a seatbelt folding operation, which requires a great deal of time and labor, during the assembly of the seatbelt. Accordingly, it is possible to reduce the number of operating steps needed for the production of the seatbelt and to assemble the seatbelt extremely easily.

In addition, since the two webbing base fabrics, which constitute the seatbelt, are cut into a width equal to that of the ordinary seatbelt, the amount of base fabric used can be reduced by a large margin in comparison to the conventional inflatable seatbelt.

What we claim is:

1. An inflatable seatbelt system for a vehicle including at least: means for generating a gas when deceleration acting on the vehicle exceeds a first set deceleration indicating occurrence of an emergency situation; a webbing having a portion brought into contact with an occupant's body, at least a part of said contact portion being formed as a bag-shaped portion; said webbing being arranged such that when no gas is generated from said gas generating means, said webbing is maintained in the shape of a strap having a predetermined width, and when a gas is generated from said gas generating means, said bag-shaped portion is inflated by the gas; a retractor operating such that when the deceleration on the vehicle is not higher than it second set deceleration, which is lower than said first set deceleration, said retractor allows said webbing to be freely wound up and unwound, and when the deceleration on the vehicle exceeds said second set deceleration, said retractor prevents unwinding of said webbing; a tongue connected to said webbing; and a buckle device with which said tongue is disengageably engaged;

wherein at least said bag-shaped portion of said webbing is formed of a webbing base fabric made out of a woven fabric, said webbing base fabric having warps disposed in a longitudinal direction of the seatbelt and wefts disposed in a lateral direction of the seatbelt, :said warps having load-elongation characteristics and almost no stretchability such that said bag-shaped portion can function as a seatbelt for restraining the occupant's body even when tension is applied thereto by expansion force generated when said bag-shaped-portion is inflated by the gas from said gas generating means upon the, occurrence of said emergency situation, and said wefts being formed so as to be stretchable by a predetermined amount when tension is applied thereto by expansion force generated when said bag-shaped portion is inflated.

2. An inflatable seatbelt system according to claim 1, wherein said wefts are formed of threads made of a material having a relatively low modulus of elasticity they are stretchable in a rubber-like manner.

3. An inflatable seatbelt system according to claim 2, wherein a tube which is inflatable by said gas is inserted into the bag-shaped portion formed of said webbing base fabric.

4. An inflatable seatbelt system for a vehicle including at least: means for generating a gas when deceleration acting on the vehicle exceeds a first set deceleration indicating occurrence of an emergency situation; a webbing having a portion brought into contact with an occupant's body, at least a part of said contact portion being formed as a bag-shaped portion; said webbing being arranged such that when no gas is generated from said gas generating means, said webbing is maintained in the shape of a strap having a predetermined width, and when a gas is generated from said gas generating means, said bag-shaped portion is inflated by the gas; a retractor operating such that when the deceleration on the vehicle is not higher than a second set deceleration, which is lower than said first set deceleration, said retractor allows said webbing to be freely wound up and unwound, and when the deceleration on the vehicle exceeds said second set deceleration, said retractor prevents unwinding of said webbing; a tongue connected to said webbing; and a buckle device with which said tongue is disengageably engaged;

wherein at least said bag-shaped portion of said webbing is formed of a webbing base fabric made out of a woven fabric, said webbing base fabric having warps disposed in a longitudinal direction of the seatbelt and wefts disposed in a lateral direction of the seatbelt, said warps having such load-elongation characteristics that said bag-shaped portion can function as a seatbelt for restraining the occupant's body even when tension is applied thereto by expansion force generated when said bag-shaped portion is inflated by the gas from said gas generating means upon the occurrence of said emergency situation, and said wefts are formed so as to be stretchable by a predetermined amount when tension is applied thereto by expansion force generated when said bag-shaped portion is inflated; and said webbing base fabric is formed by joining together respective side edges of two webbing base fabrics set to have a predetermined width under normal circumstances.

5. An inflatable seatbelt system according to claim 4, wherein said wefts are formed of threads made of a material having a relatively low modulus of elasticity and stretchable in a rubber-like manner.

6. An inflatable seatbelt system according to claim 4, wherein said wefts are formed by coiling a second thread, made of a material having a high modulus of elasticity and high strength and set to a length which is the same as a predetermined width of said bag-shaped portion after the inflation, around a first thread made of a material having a relatively high modulus of elasticity and set to a length which is the same as a predetermined width of said bag-shaped portion under normal circumstances.

7. An inflatable seatbelt system according to claim 4, wherein said wefts are formed of a mixture of a thread made of a material having a relatively low modulus of elasticity that are stretchable in a rubber-like manner and a thread made of a material having a relatively high modulus of elasticity and relatively low strength.

8. An inflatable seatbelt system according to claim 4, wherein a tube which is inflatable by said gas is inserted into the bag-shaped portion formed of said webbing base fabric.

9. An inflatable seatbelt system for a vehicle including at least: means for generating a gas when deceleration acting on the vehicle exceeds a first set deceleration indicating occurrence of an emergency situation; a webbing having a portion brought into contact with an occupant's body, at least a part of said contact portion being formed as a bag-shaped portion; said webbing being arranged such that when no gas is generated from said gas generating means, said webbing is maintained in the shape of a strap having a predetermined width, and when a gas is generated from said gas generating means, said bag-shaped portion is inflated by the gas; a retractor operating such that when the deceleration on the vehicle is not higher than a second set deceleration, which is lower than said first set deceleration, said retractor allows said webbing to be freely wound up and unwound, and when the deceleration on the vehicle exceeds said second set deceleration, said retractor prevents unwinding of said webbing; a tongue connected to said webbing; and a buckle device with which said tongue is disengageably engaged;

wherein at least said bag-shaped portion of said webbing is formed of a webbing base fabric made out of a woven fabric, said webbing base fabric having warps disposed in a longitudinal direction of the seatbelt and wefts disposed in a lateral direction of the seatbelt, said warps having such load-elongation characteristics that said bag-shaped portion can function as a seatbelt for restraining the occupant's body even when tension is applied thereto by expansion force generated when said bag-shaped portion is inflated by the gas from said gas generating means upon the occurrence of said emergency situation, and said wefts are formed so as to be stretchable by a predetermined amount when tension is applied thereto by expansion force generated when said bag-shaped portion is inflated; and said wefts are formed by coiling a second thread, made of a material having a high modulus of elasticity and high strength and set to a length which is the same a predetermined width of said bag-shaped portion after the inflation, around a first thread made of a material having a relatively high modulus of elasticity and set to a length which is the same as a predetermined width of said bag-shaped portion under normal circumstances.

10. An inflatable seatbelt system according to claim 9, wherein a tube which is inflatable by said gas is inserted into the bag-shaped portion formed of said webbing base fabric.

11. An inflatable seatbelt system for a vehicle including at least: means for generating a gas when deceleration acting on the vehicle exceeds a first set deceleration indicating occurrence of an emergency situation; a webbing having a portion brought into contact with an occupant's body, at least a part of said contact portion being formed as a bag-shaped portion; said webbing being arranged such that when no gas is generated from said gas generating means, said webbing is maintained in the shape of a strap having a predetermined width, and when a gas is generated from said gas generating means, said bag-shaped portion is inflated by the gas; a retractor operating such that when the deceleration on the vehicle is not higher than a second set deceleration, which is lower than said first set deceleration, said retractor allows said webbing to be freely wound up and unwound, and when the deceleration on the vehicle exceeds said second set deceleration, said retractor prevents unwinding of said webbing; a tongue connected to said webbing; and a buckle device with which said tongue is disengageably engaged; wherein at least said bag-shaped portion of said webbing is formed of a webbing base fabric made out of a woven fabric, said webbing base fabric having warps disposed in a longitudinal direction of the seatbelt and wefts disposed in a lateral direction of the seatbelt, said warps having such load-elongation characteristics that said bag-shaped portion can function as a seatbelt for restraining the occupant's body even when tension is applied thereto by expansion force generated when said bag-shaped portion is inflated by the gas from said gas generating means upon the occurrence of said emergency situation, and said wefts are formed so as to be stretchable by a predetermined amount when tension is applied thereto by expansion force generated when said bag-shaped portion is inflated; and said wefts are formed of a mixture of a thread made of a material having a relatively low modulus of elasticity that are stretchable in a rubber-like manner and a thread made of a material having a relatively high modulus of elasticity and relatively low strength.

12. An inflatable seatbelt system according to claim 11, wherein a tube which is inflatable by said gas is inserted into the bag-shaped portion formed of said webbing base fabric.

* * * * *